United States Patent
Hansen et al.

(10) Patent No.: US 6,210,507 B1
(45) Date of Patent: Apr. 3, 2001

(54) METHOD FOR THE MANUFACTURE OF A PLASTIC WINDOW

(75) Inventors: Helge Hansen, Greve Strand (DK); Hans-Georg Treusch; Heidrun Putz, both of Aachen (DE)

(73) Assignee: Thermoform A/S (DK)

( * ) Notice: Subject to any disclaimer, the term of this patent is extended or adjusted under 35 U.S.C. 154(b) by 0 days.

(21) Appl. No.: 09/240,232

(22) Filed: Jan. 29, 1999

(30) Foreign Application Priority Data

Jan. 29, 1998 (DK) .............................. 1998 00127

(51) Int. Cl.⁷ ...................................... B32B 31/20
(52) U.S. Cl. ................... 156/109; 156/272.8; 156/273.7; 156/308.2; 219/121.64
(58) Field of Search ............................ 156/99, 107, 108, 156/109, 272.8, 273.7, 275.1, 308.2, 308.4; 219/121.63, 121.64

(56) References Cited

U.S. PATENT DOCUMENTS 3,560,291 * 2/1971 Foglia et al. ...................... 156/272.8
4,237,363 12/1980 Lemelson ............................ 219/121
5,581,971 12/1996 Peterson ................................ 52/786
5,893,959 * 4/1999 Muellich ........................... 156/272.8

FOREIGN PATENT DOCUMENTS

| 3304717 | 8/1984 | (DE) . |
| 4432081 | 3/1996 | (DE) . |
| 0126787 | 12/1984 | (EP) . |
| 0159169 | 10/1985 | (EP) . |
| 0472850 | 3/1992 | (EP) . |
| 0751865 | 5/1998 | (EP) . |

* cited by examiner

Primary Examiner—Michael W. Ball
Assistant Examiner—Michael A. Tolin
(74) Attorney, Agent, or Firm—Ostrolenk, Faber, Gerb & Soffen, LLP

(57) ABSTRACT

A method for the manufacture of a plastic window comprising a frame (2) and at least one pane (4a, 4b) of transparent plastic, in which method the pane (4a, 4b) is joined with the frame (2) at an abutment surface (3a, 3b) provided thereon. The joining is performed by welding with laser light (8), and while the welding is performed, an average abutment pressure of at least approx. 2 MPa is provide between the pane (4a, 4b) and the frame (2).

12 Claims, 5 Drawing Sheets

METHOD FOR THE MANUFACTURE OF A PLASTIC WINDOW

BACKGROUND OF THE INVENTION

The present invention relates to a method for the manufacture of a plastic window comprising a frame and at least one pane of transparent plastic, in which method the pane is joined with the frame at an abutment surface provided thereon, and a window manufactured by said method.

In particular in case of windows of the type, in which, in consideration of thermal insulation, several panes are positioned in several layers, such that an air-filled cavity is enclosed, it is desirable that the enclosed cavity is hermetically sealed. This is due to the fact that if the cavity is not hermetically closed, moisture may penetrate and condensate on the interior side of the pane facing the cavity, the result being lack of an aesthetic appearance and opacity.

To ensure this hermetic joining, traditional joining methods like gluing have been used for windows, in which both frame and panes are made from plastic.

It is within plastic technology known to use laser welding for joining smaller objects, like eg. lids to containers. Such methods are for instance known from DE-A-44 32 081, EP-A-472 850 or EP-B-751 865.

Gluing of larger pieces of work, like window panes, is, however, among others in consideration of the working environment, a complicated, clow and consequently costly process. For that reason it would therefore be desirable if laser welding could be used for this joining.

It has, however, turned out that problems arise in respect of tightness, when attempts are made to weld larger objects, like exactly window panes, by laser.

SUMMARY OF THE INVENTION

The invention resides in the realization that the case of the problems in respect of weldings, which are not tight, is due to micro irregularities, which will invariably be found in the surfaces of the individual parts, of which the window is composed. Such micro irregularities, which are typically in the area of a few hundredth mm, derive for instance from sink marks in the surface, ejector marks, variations in the extrusion speed, etc., all depending on the method, by which the part in question is manufactured. These irregularities cannot normally be avoided or can only be avoided by means of precautions which make these parts considerably more costly.

It is thus the object of the invention to provide a method for laser welding of windows of the type mentioned by way of introduction, which method surmounts the problems deriving from inevitable micro irregularities in the materials used.

This object is met by a method of the type mentioned by way of introduction, according to which method the joining is performed by welding with laser light, and in which, while the welding is being performed, an average abutment pressure is established between the pane and the frame of at least approx. 2 MPa ($2\times10^6$ N/m$^2$).

In an advantageous embodiment of the invention the pressure is obtained by clamping the pane between the frame and a frame-shaped pressing means.

The advantage is that the frame-shaped pressing means through its aperture gives access to the laser light for the exposure, and at the same time such a frame is easy to manufacture from a tool technical point of view.

In a another embodiment of the invention the pressure is obtained by pressing the frame and the pane between two pressing plates, of which at least one is of a transparent material, preferably glass.

The advantage is that plane-parallelism can be obtained, which makes a more homogenous abutment pressure possible, as the force is applied directly above the place, where the welding is to be performed.

In an advantageous embodiment of the invention, the laser light exposes a limited area of the abutment surface, and this area is moved along the part of the abutment surface, which is to be welded together with the pane.

The advantage is that only one laser head is required for the welding, which welding head then in a relatively uncomplicated manner may be moved along the welding seam by means of a robot.

In an advantageous variant of the above-mentioned embodiment, the exposure by laser light is performed in several steps during the pressing, and such that the intensity in a first step is sufficient for softening the plastic in the frame and such that the intensity in at least one of the subsequent steps provides the liquefaction necessary for the welding.

Hereby is obtained that it becomes possible for the abutment pressure to plastically deform the interface in such a way that the irregularities to a certain degree are smoothed before the actual welding takes place.

This stepwise exposure is advantageously obtained in that the limited area, which is exposed by the laser light, is elongate, and in that the intensity viewed over the longitudinal direction of the area is unevenly distributed with high intensity in a central area and lower intensity in the two end areas.

The advantage is that the light distribution also with a single laser is easily obtained by optic means.

In yet another embodiment of the invention the laser light exposes during the welding at one instant simultaneously the entire part of the abutment surface, which is to be welded together with the pane.

The advantage is that the welding may be performed at a high speed.

In yet another advantageous embodiment of the invention the frame is designed such that the abutment surface, viewed in a direction transversely to its longitudinal direction, establishes a substantially homogenous pressure between itself and the pane during the pressing.

This contributes to ensuring the required abutment pressure, a good and homogenous welding being thus obtained.

In an advantageous embodiment, the frame is designed such that the abutment surface before the pressing forms an acute angle of preferably between 5° and 30° with the pane.

Hereby an elastic deformation of the frame is obtained, which ensures the required homogenous pressure.

In yet another embodiment of the invention, two abutment surfaces for two panes are provided on the frame, which surfaces face away from each other, and the welding is carried out simultaneously at the two abutment surfaces.

The advantage is that a completely hermetic window may be welded in one single operation.

In yet another advantageous embodiment of the invention two abutment surfaces for two panes are provided on the frame, which surfaces face in the same direction, and the welding is first performed at one of the abutment surfaces and then at the second abutment surface.

The advantage is that welding only has to be performed from one side, which permits the use of simpler equipment for the pressing.

In an advantageous embodiment of the window according to the invention, the frame is moulded.

This is an easy and cheap way of manufacturing frames on a large scale.

In an advantageous embodiment of the window according to the invention, the window comprises one frame and two panes such that the frame and the two panes enclose a cavity, which is hermetically closed.

This provides in a simple manner a window with good thermal insulating properties.

In yet another embodiment of the window according to the invention, the frame is substantially symmetrical around a plane which is parallel with the two panes.

The advantage is that by pressing the pane and by welding the pane from both sides, part systems having the same properties may be used, which ensured a homogenous quality.

BRIEF DESCRIPTION OF THE DRAWINGS

The invention will now be described in detail in the following with reference to the drawings, in which.

DETAILED DESCRIPTION OF THE PREFERRED EMBODIMENTS

Figures 1A, 1B:
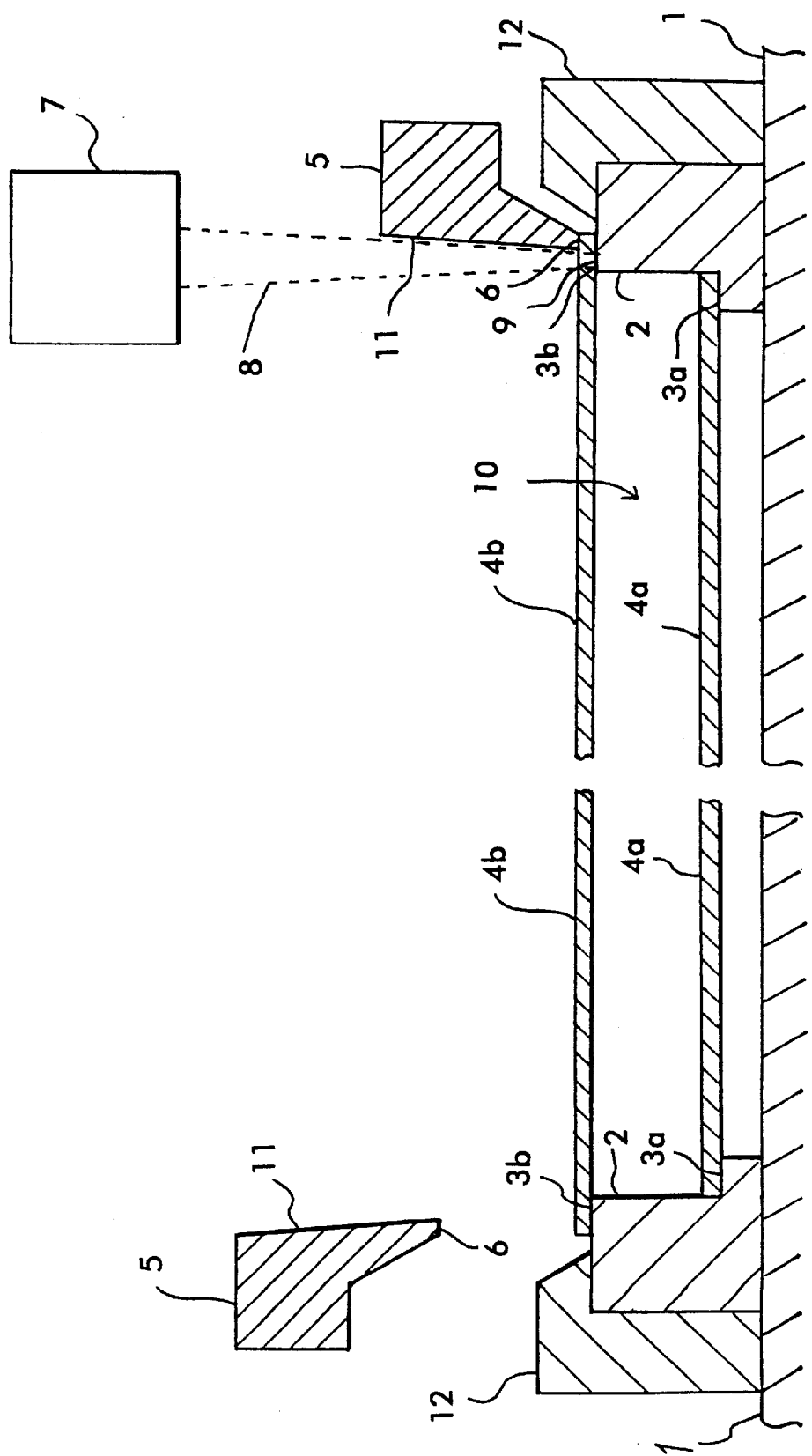
FIG. 1a is a schematic sectional view of a first embodiment of a device for carrying out the method according to the invention, FIG. 1b a schematic sectional view of the device according to FIG. 1a, in a different position, FIG. 2a a schematic sectional view of a second embodiment of a device for carrying out the method according to the invention, FIG. 2b a schematic sectional view of the device according to FIG. 2a, in a different position, FIG. 3a a schematical view of a third embodiment for carrying out the method according to the invention during the welding of an inner pane, and FIG. 3b another schematical view of the third embodiment, but during the welding of an outer pane.

Reference is first made to FIGS. 1a and 1b. These figures show a device for carrying out the method according to the invention in an open and in a closed position, respectively. The device comprises a fixed base 1, on which a frame 2 is mounted. The frame 2, which is here shown in a sectional view, has a closed shape. On the frame 2 abutment surfaces 3a, 3b are provided, on which the panes 4a, 4b, to be welded to the frame may be positioned.

For the initial securing and positioning of the frame 2 and the pane 4b, a securing means 12 may be provided.

In the figures two panes are shown, the lower one 4a being a pane, which has already been welded on, whereas the upper pane 4b is a pane, which is positioned in the device, but not yet welded on. The two panes 4a, 4b are both welded on by use of the method according to the invention as exemplified below.

The panes 4a, 4b are made from a plastic material, which is transparent for visible light and for light with a wavelength corresponding to the laser used for the welding. The frame 2 is, however, at least at the abutment surfaces 3a, 3b, absorbing the laser light.

Furthermore, when choosing the materials for the panes 4a, 4b and the frame 2, consideration should be shown to the fact that the materials have to be compatible, i.e. that the materials generally can be joined by thermal influence.

For providing the pressure during the welding, the device comprises a frame-shaped pressing means 5 with a pressure surface 6. In FIG. 1a the pressing means 5 is shown in a raised position which makes it possible to place a pane 4b on the abutment surface 3b. In FIG. 1b the pressing means 5 is shown in a lowered position, in which it presses against the pane 4b with a force which is sufficient for providing the required abutment pressure between the pane 4b and the abutment surface 3b. To optimally utilize the force, with which the pressure surface 6 acts on the pane 3b for establishing the necessary abutment pressure, the pressing means 5 is designed with such dimensions that the pressure surface 6 affects the pane 4b so close to vertical as possible above the part of the abutment surface 3b, on which the welding is to be performed, without blocking the laser light 8, which is to expose said part of the abutment surface 3b.

To prevent the pressing means 5 from shading the laser light 8, the interior upright side 11 of the pressing means may, as shown, have a small angle relative to vertical. This angle is preferably chosen such that it corresponds to the angle, with which the laser light 8 converges. Alternatively or as a supplement the laser head may be held in an oblique position, such that the angle of incidence for the laser light 8 is different from 90°.

When the pane 4b, as shown in FIG. 1b, is clamped between the frame 2 and the pressing means 5, the required abutment pressure between the pane 4b and the abutment surface 3b being established, the welding is performed under continuous retention of the abutment pressure. The welding is performed by use of a laser which is preferably an infrared semiconductor laser with a power of 40–90 W. This semiconductor laser is positioned in a movable head 7, which in addition to the laser among others may contain a cooling system.

The head 7 is preferably designed for being accommodated in a robot (not shown), which makes a controlled movement of the head 7 possible.

The laser light 8 from the head 7 is focused on a limited area in the border area between the abutment surface 3b and the pane 4b. This limited area is in the following described as a luminous spot 9. This luminous spot 9, in which the laser light 8 is focused, preferably has an elongate shape, for instance elliptical, and have an intensity distribution in the longitudinal direction with highest intensity in the central area and lower intensity in the end areas.

Alternatively, the laser light 8 may expose during the welding at one instant simultaneously the entire part of the abutment surface which is to be welded together with the pane. This procedure will aid in decreasing the time required for welding.

The width of the elongate area may be smaller than the width of the abutment surface. Typically, the width of the abutment surface may be 4 mm and the dimensions of the elongate area may be a width of 3 mm and a length of 35 mm.

The luminous spot 9 is during the welding moved in a closed curve around along the frame 2, such that also the welding together of the frame 3b and the pane 4b, which is performed at the abutment surface, forms a closed curve, the window becoming thus tight along the whole length of the frame.

In this way a hermetically closed cavity 10 is provided between the frame 2 and the two panes 4a, 4b.

During the movement of the luminous spot 9, the longitudinal direction of the limited area will preferably be parallel with its moving direction. When the luminous spot 9 has the above-mentioned, uneven intensity distribution across the longitudinal direction, the effect is that, during the moving of the luminous spot 9, an area at the interface area between the abutment surface and the pane is firstly exposed to light with low intensity and subsequently to light with a higher intensity.

The low intensity is chosen such that at a given moving speed, a heating of the plastic, of which the frame consists, takes place, which heating is sufficient for softening but not melting the plastic in the area.

The area is then, as mentioned, exposed by light with a higher intensity. This higher intensity is chosen such that it is sufficient for melting the plastic in the cavity and thus for providing the welding. It should, however, not be chosen so high that the material boils or chars.

Due to the heating and thus the softening of the plastic before the welding, the abutment pressure applied gets time to affect the interface, which positively contributes to smoothing any irregularities and subsequent cavities. This ensures a good, thermal contact between the molten frame material and the pane. The good thermal contact is important as the transparent pane only to a slight extent is heated by the laser and the heating of the pane material, to the extent necessary for joining the two materials, can thus only take place through heat transfer from the molten frame material.

It is also possible to skew the longitudinal direction of the luminous spot 9 in order to affect the intensity distribution. Typically, such skew will be with a quite small angle, for instance 3–5°.

For the sake of good order it should be mentioned that for the welding of the lower pane 1a, a frame (not shown) is used, said frame corresponding in principle to the frame 5 shown. The frame not shown has dimensions, which adapted to the profile of the frame make it possible both to provide the required pressure and to expose the abutment surface 3a, which is positioned lower, by the laser light. This means, in the case illustrated, shorter sides and increased depth.

If the welding of both panes 4a, 4b takes place at the same station in a manufacturing process, only one and the same laser head 7 will in the above case be used, said head being moved by means of one and the same robot along different paths.

Figure 2A:
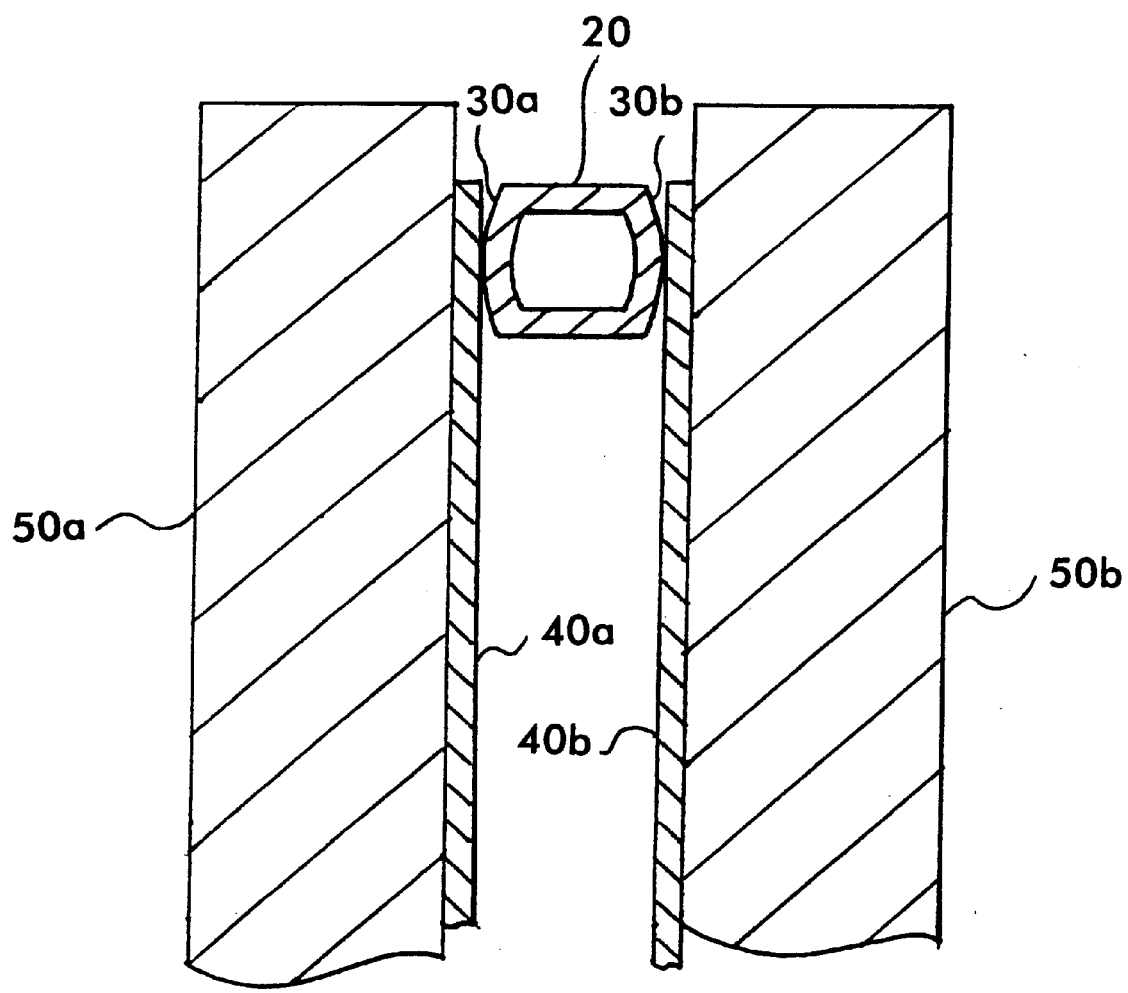
Figure 2B:
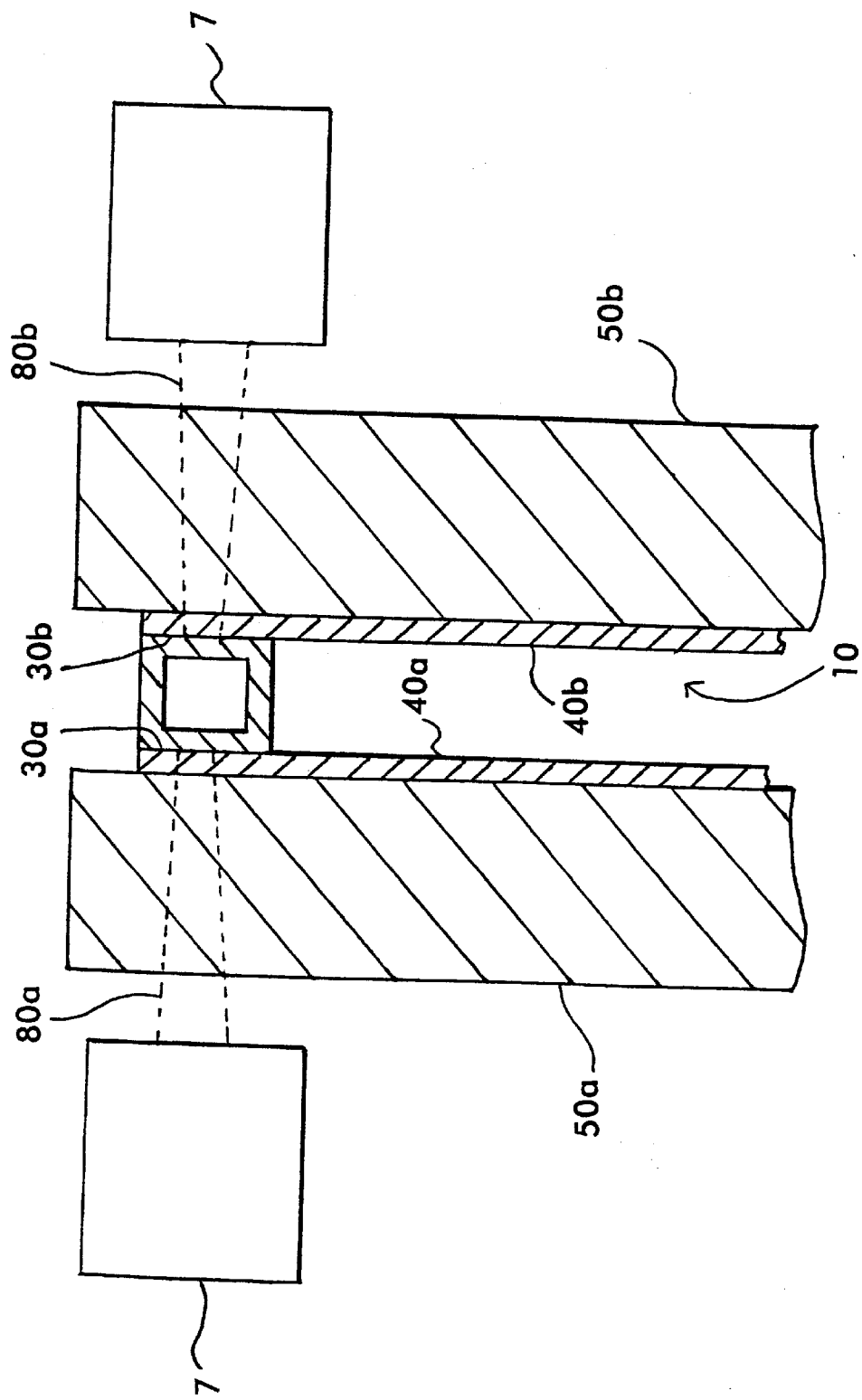

FIGS. 1a and 1b show a frame 2 with a solid cross-section. Many other frame cross-sections may be possible. For instance frames with a hollow cross-section, as shown in FIGS. 2a and 2b, and frames with abutment surfaces 3a; 300a in the form of flanges as shown in FIGS. 1a, 1b; 3a, 3b, respectively. Actually frames of any kind may be used, provided they do not give in to the abutment pressure to such an extent that an uneven abutment pressure and consequently a too low abutment pressure, occurs across a part of the abutment surface, in which the welding is to be performed.

In FIGS. 2a and 2b a second embodiment of a device for performing the method according to the invention is shown in a closed, but not yet clamped position and in a clamped position, respectively.

In this embodiment the device comprises two transparent pressing plates 50a, 50b. Between the pressing plates 50a, 50b, a frame 20 is placed, and on each side thereof two panes 40a, 40b.

The frame 20 has a closed shape, but is only shown as a cross-section through one of its sides. The frame 20 is furthermore shown with a symmetrical and hollow cross-section, but the above considerations in respect of examples of cross-sections may also be applied here. However, with the reservation that the abutment surfaces have to face away from each other.

In FIG. 2b the device is shown in a condition, in which a pressing of the frame 20 and the panes 40a, 40b between the pressing plates 50a, 50b takes place, such that the required abutment pressure is provided.

It should be emphasized that the drawing is schematic and that, during the pressing, a certain bulging (not shown) may take place of the surfaces which are not abutment surfaces.

In this clamped condition the laser light 80a, 80b is focused from two sides through a pressing plate 50a, 50b in a luminous spot 90a, 90b on each side of the frame 20. These luminous spots 90a, 90b are then under continuous pressing moved along the length of the frame in a closed curve. In this way, the frame 20 and the panes 40a, 40b are welded together, such that a hermetically closed cavity 10 is provided, which cavity is enclosed by the frame 20 and the panes 40a, 40b.

It appears from FIG. 2a that the cross-section of the frame has a convex shape on the sides facing the pressing plates 50a, 50b. This convex shape is strictly speaking not necessary, but may contribute to ensuring an homogenous abutment pressure on the part of the abutment surface 30a, 30b which is to be welded together with the pane, so as to prevent provision of an unnecessarily high force for establishing the required abutment pressure over the entire part of the abutment surface 30a, 30b.

It should be mentioned that it is of course possible by the method according to the invention as shown in FIGS. 2a, 2b, to use only one transparent pressing plate and to weld twice instead. If so, the window should be turned in between the two welding operations.

Figure 3A:
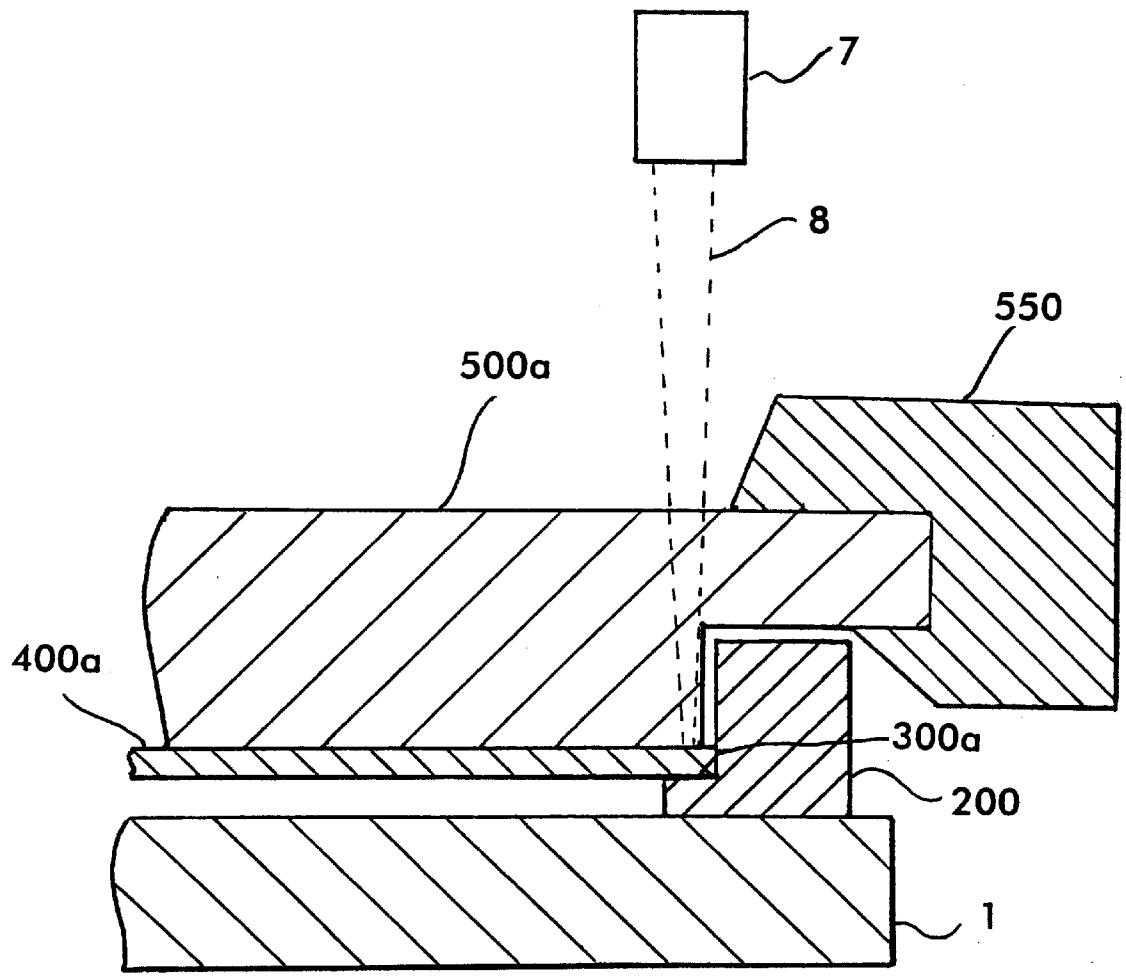
Figure 3B:
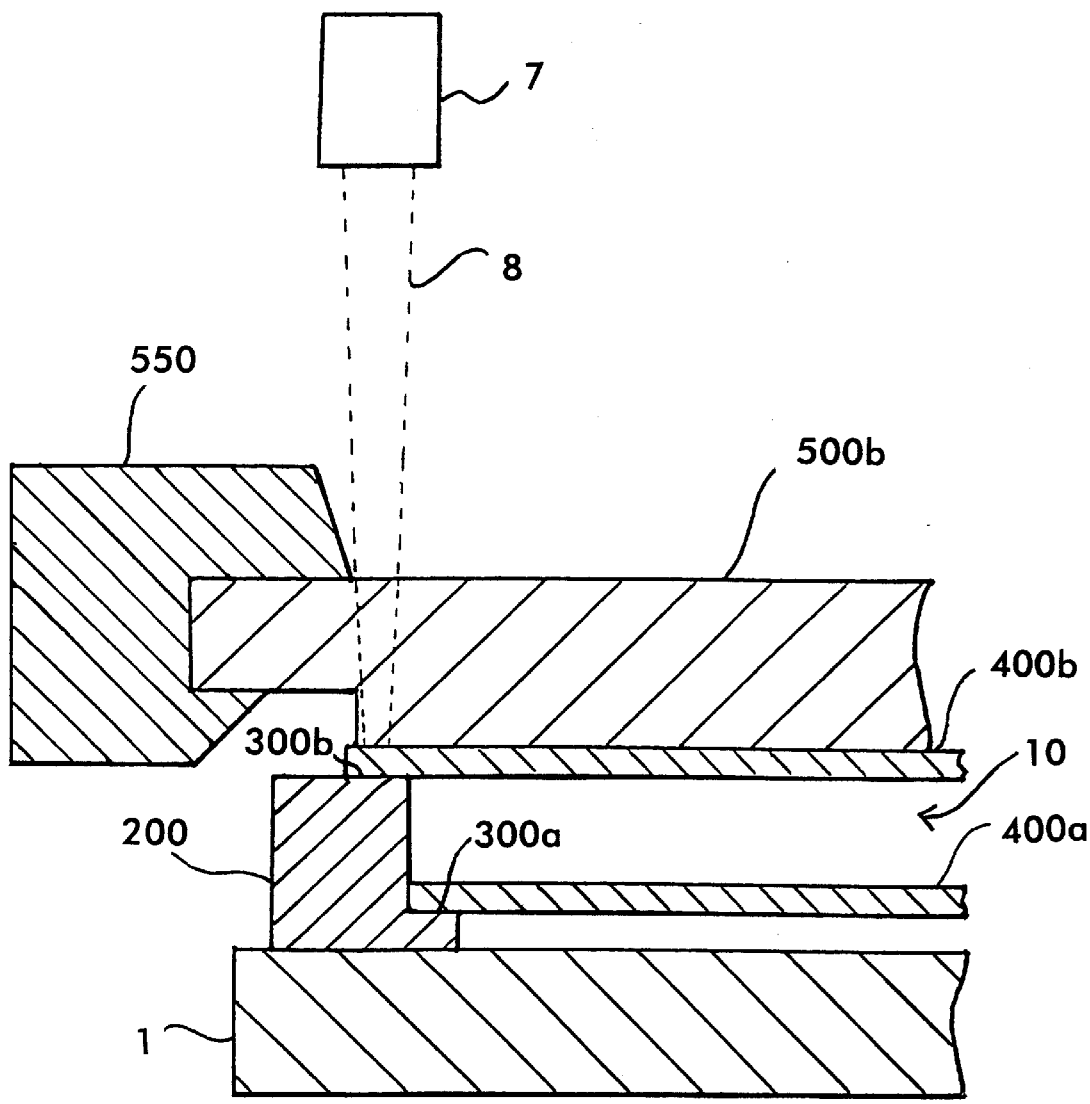

FIGS. 3a, 3b shows a third embodiment according to the invention in which the welding of two panes 400a, 400b takes place from the same side of the frame 200. The frame 200 is placed on a support 1, which may eg. be a fixed base or a movable counter pressing plate.

In FIG. 3a an inner pane 400a is placed on an abutment surface in the form a flange 300a of the frame. Subsequently the abutment pressure of more 2 MPa, is applied by means of a first pressing plate 500a of a transparent material such as glass. The pressure is then sustained during the welding with the laser beam 8 from the semiconductor laser 7, which may be carried out in the same manner as described earlier in connection with the other embodiments. Even though not shown in this embodiment, there may be provided means for temporarily fixing the frame 200 and pane 400a, 400b so as to secure their positions before they are clamped.

Subsequently to the welding of the inner pane 400a the outer pane 400b is placed on another abutment surface 300b of the frame 200, as shown in FIG. 3b. Abutment pressure is then applied by means of a second pressing plate 500b, also of a transparent material such as glass, but of different dimensions compared to the first pressing plate.

The pressing plates 500a, 500b need to differ from each other, because it is necessary for the first pressing plate 500a to both fit within the frame 2 and reach to the depth of the first pane 400a. The second pressing plate 500b need not reach deep into the frame to reach the second pane 300b, but must instead have an area matching the larger area of the second pane 300b compared to the first pane 300a.

Both of the frames 500a, 500b are held in a movable steel mounting 500, connected to the source for the force necessary to achieve the required pressure.

The nature of the source for the force is not as such essential to the invention, and any source able to provide the force necessary for achieving the required pressure, such as pneumatic, hydraulic, mechanical, or even gravitation, may be utilized in any of the embodiments.

Further it should be mentioned that instead of using a movable transparent pressing plate, it is within the scope of the invention equally possible to have a fixed transparent pressing plate and a movable counter pressing plate.

For a typical frame with a circumference of approximately 2 m and a width of the abutment surface of 4 mm as mentioned above the force necessary to achieve the required abutment pressure can be calculated as:

Force=Pressure×width×length or

Force—$2 \times 10^6$ $N/m^2 \times 0.004$ m×2 m=16000 N or approximately 1600 kg. For frames with larger abutment surfaces, eg. wider flanges or larger frames, the force needs will of course be larger.

Finally it should be mentioned that it is possible to perform the method according to FIGS. 1a, 1b; 2a, 2b as well as FIGS. 3a, 3b for welding only a single pane to a frame. This results in a tight pane which, however, does not have the thermic insulation properties which are obtained by using two panes which define a cavity.

For the one skilled in the art numerous modifications may come to mind of the method described above and the device used therefor.

What is claimed is:

1. A method for the manufacture of a plastic window comprising a frame and at least one pane of transparent plastic, in which method the pane is joined with the frame at an abutment surface provided thereon, wherein the joining is performed by welding with laser light, and in that, while the welding is being performed, an average abutment pressure of at least approximately 2 Mpa is provided between the pane and the frame.

2. A method according to claim 1, wherein the pressure is obtained by clamping the pane between the frame and a pressing means.

3. A method according to claim 1, wherein the pressure is obtained by pressing the frame and the pane between two pressing plates, of which at least one is of a transparent material.

4. A method according to claim 1, wherein the laser light exposes a limited area of the abutment surface, and that this area is moved along the part of the abutment surface which it is desired to weld together with the pane.

5. A method according to claim 4, wherein the exposure by laser light is performed in several steps during the pressing, and wherein the intensity in a first step is sufficient for softening the plastic in the frame and the intensity in at least one of the subsequent steps provides the liquefaction necessary for the welding.

6. A method according to claim 5, wherein the limited area, which is exposed by the laser light, is elongate, and the intensity viewed over the longitudinal direction of the area is unevenly distributed with high intensity in a central area and lower intensity in the two end areas.

7. A method according to claim 4, wherein a robot is used for moving the limited area along the abutment surface.

8. A method according to claim 1, wherein the laser light exposes the entire part of the abutment surface which it is desired to weld together with the pane.

9. A method according to claim 1, wherein the frame is designed such that the abutment surface establishes a substantially homogeneous pressure between itself and the pane during the pressing.

10. A method according to claim 9, wherein the abutment surface before the pressing forms an acute angle of between 5° and 30° with the pane.

11. A method according to claim 1, wherein the frame is provided with two abutment surfaces, which face away from each other, for two panes, and that the welding is carried out simultaneously at the two abutment surfaces.

12. A method according to claim 1, wherein the frame is provided with two abutment surfaces, which face in the same direction, for two panes, and that the welding is first performed at one of the abutment surfaces and then at the other abutment surface.

* * * * *